W. DALTON.
LOCOMOTIVE DRIVING CONNECTION.
APPLICATION FILED SEPT. 1, 1916.
1,228,751.
Patented June 5, 1917.
2 SHEETS—SHEET 2.
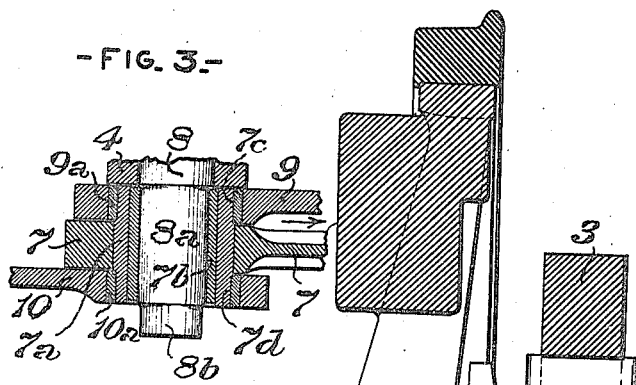
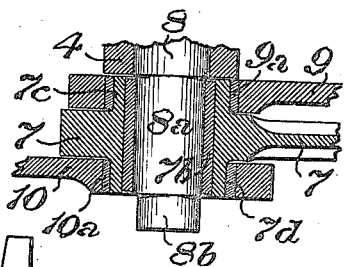
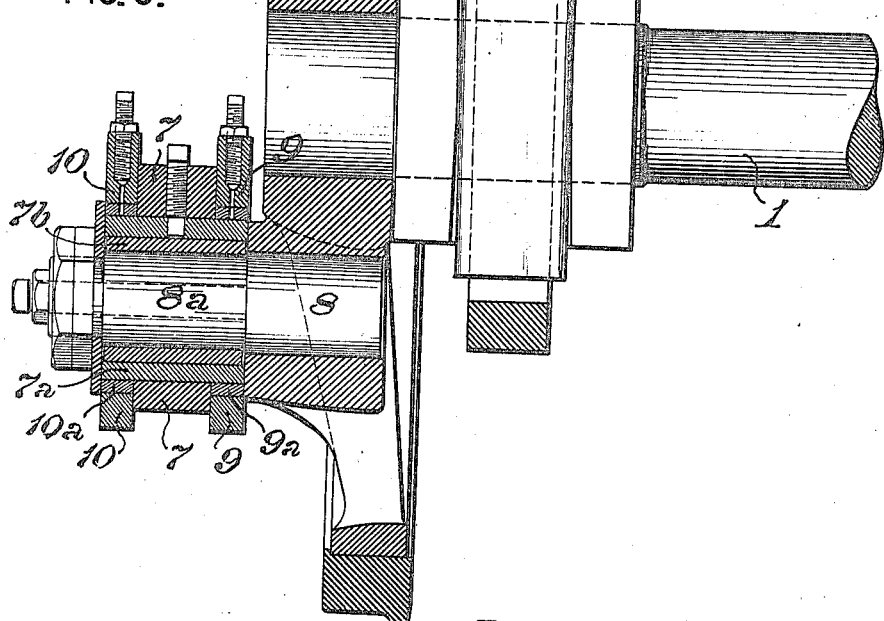
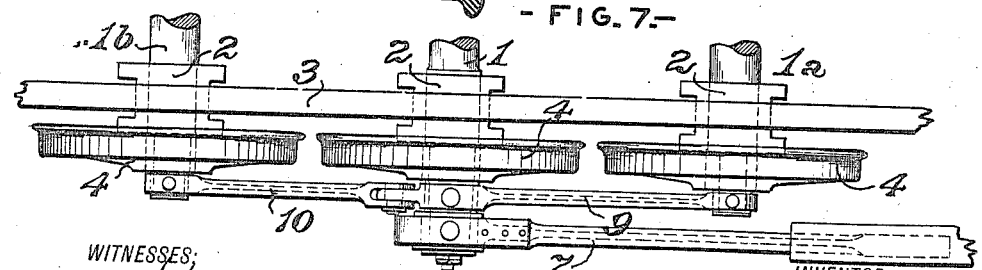
WITNESSES:
Edward Wright
S. R. Bell
INVENTOR
William Dalton
by J. Snowden Bell,
Atty

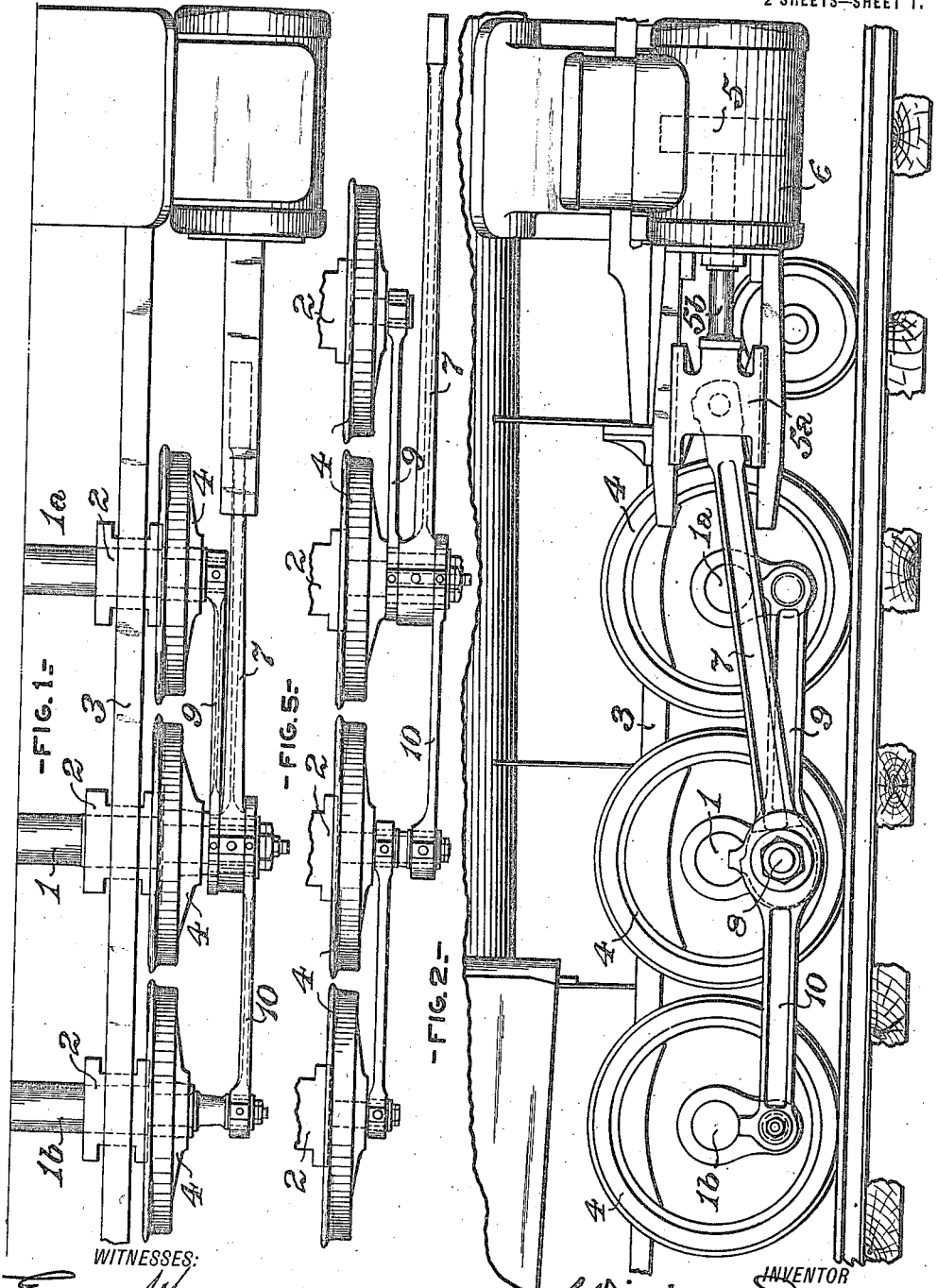

UNITED STATES PATENT OFFICE.

WILLIAM DALTON, OF SCHENECTADY, NEW YORK.

LOCOMOTIVE DRIVING CONNECTION.

1,228,751. Specification of Letters Patent. Patented June 5, 1917.

Application filed September 1, 1916. Serial No. 117,991.

*To all whom it may concern:*

Be it known that I, WILLIAM DALTON, of Schenectady, in the county of Schenectady and State of New York, have invented a certain new and useful Improvement in Locomotive Driving Connections, of which improvement the following is a specification.

My invention relates to means for transmitting operative power from the pistons of a locomotive engine to three or more pairs of coupled driving wheels, and its object is to provide therefor a system of rod connections which shall be of simple construction, and ready applicability in the various types of locomotives having a plurality of pairs of coupled driving wheels, and which will attain the advantages, in practice, of eliminating bending moment on the main rods by strain thereon through the coupling rods; of enabling the size of the main crank pins to be reduced, with a resultant reduction of the distance between the axes of the cylinders, thereby decreasing transverse racking and strain of the locomotive, due to the reduction of the lever arms through which the piston thrust acts on the frame, and enabling larger cylinders to be applied within determined clearance limits; and of reducing the rotating weights on the main crank pins and the driving work performed by said pins; thereby reducing the tendency to the heating thereof, which in heavy locomotives having five pairs of coupled driving wheels, has often been found to be seriously objectionable.

The improvement claimed is hereinafter fully set forth.

My invention has been devised to meet certain newly presented conditions which have been developed by the application of heavier piston thrusts in existing locomotive designs. With the increase in size and in the number of coupled driving wheels which has been made in recent practice, the work imposed upon the connecting rods has greatly increased, and it is not only necessary to make the rotating parts of the rod driving mechanism extremely heavy, but also to overcome increasing difficulty in providing sufficiently large main crank pins. In the ordinary construction of rod driving mechanism, all of the piston thrust passes through the piston rods, cross heads, cross head pins, and main rods, to the main rod bearings of the main crank pins. The coupling rods are, in ordinary practice, attached to the coupling rod bearings of the main pins, inside of the main rod bearings, and, consequently, the coupling rod bearings on the main pins are required to transmit, through the coupling rods, the power necessary to rotate all the driving wheels except the main wheels. It is therefore evident that both the main rod bearings on the main crank pins and the coupling rod bearings thereon, must each be designed with bearing surfaces sufficiently large to carry their respective loads, the provision of which bearing surface results in a considerable overhang of the main crank pins, from the wheel hubs to the center lines of the main rods, which overhang determines, in most cases, the minimum transverse distance between the axes of the cylinders of the locomotive. This distance should, for reasons well known to locomotive constructors, be made as short as possible.

My invention is designed to satisfactorily comply with the requirements above noted, without involving increased complication of structure or difficulty of application, and its characteristic novel feature, broadly stated, consists in a system of driving connections for locomotives having a plurality of pairs of driving wheels, in which the coupling rods which rotate the driving wheels other than the main wheels, are coupled directly to, and bear directly on, the main rods, instead of to and on the main crank pins, as in ordinary practice; the rotative effort of the pistons (except that portion of it which rotates the main wheels) being thereby transmitted to the coupled wheels directly, instead of through the main crank pins.

In the accompanying drawings: Figure 1 is a plan or top view of the driving connections on one side of a locomotive engine, ilustrating an application of my invention; Fig. 2, a side view, in elevation, of the same; Fig. 3, a partial horizontal section, in the axial plane of the main crank pin; Fig. 4, a similar section, illustrating a modification of structural detail; Fig. 5, a plan view, illustrating an application in an eight coupled locomotive; Fig. 6, a vertical section, in the axial plane of the main driving axle and main crank pin; and, Fig. 7, a plan view, illustrating a standard construction of the prior art.

My invention is herein exemplified as applied in a locomotive engine having a main driving axle, 1, a front driving axle, 1ª, and a rear driving axle, 1ᵇ, which axles are fitted in journal boxes, 2, mounted in the side frame members, 3, of the locomotive, and have secured upon them pairs of driving wheels, 4, in the usual manner. Rotation is imparted to the driving axles from pistons, 5, working in the cylinders, 6, through main connecting rods, 7, which are coupled, at their forward ends, to cross heads, 5ᵃ, secured upon the rods, 5ᵇ, of the pistons, and, at their rear ends, to main crank pins, 8, fixed in the wheels of the main driving axle, 1. The wheels of the front and rear driving axles are coupled to those of the main driving axle by coupling rods or side rods, 9 and 10, and, as thus far described, the disposition of the driving connections, is similar to that in ordinary present practice, which is illustrated in Fig. 7.

In the practice of my invention, referring descriptively to the specific embodiment thereof which is herein illustrated, and to one side only of the locomotive, the main crank pin, 8, instead of being, as heretofore, provided with separate and adjoining main rod and coupling rod bearings, has a main rod bearing, 8ᵃ, only, which bearing extends throughout the working length of the crank pin, that is to say, from the hub in the driving wheel in which it is secured, to an extension, 8ᵇ, of reduced diameter, at its outer end, which extension is, in the most approved present practice, formed upon it for the attachment of an outside valve gear. The end of the main rod, 7, is made solid, and, in the preferred construction shown in detail in Fig. 3, a heavy steel bushing, 7ᵃ, is pressed and keyed into it. The bushing, 7ᵃ, corresponds in length with the main rod bearing, 8ᵃ, of the crank pin, upon which it is fitted, an ordinary brass bushing, 7ᵇ, which may be either pressed into the bushing, 7ᵃ, or be allowed to loosely rotate, being preferably interposed between the bushing, 7ᵃ, and the main rod bearing, 8ᵃ, of the crank pin.

The peripheries of the end portions of the bushing, 7ᵃ, which project on opposite sides of the main rod, form coupling rod bearings, 7ᶜ and 7ᵈ, on which the solid ends of the coupling rods, 9 and 10, are, respectively, fitted. Bushings, 9ᵃ and 10ᵃ, are preferably interposed between the ends of the said rods and the bearings. It will be understood that these, and the other bushings previously referred to, are applied for the usual purpose of providing more durable and efficient wearing surfaces, and therefore that, while desirably applicable, they are not essentials of my invention. For example, the main rod bushing, 7ᵃ, may, if desired, be omitted, and the coupling rod bearings, 7ᶜ and 7ᵈ, be formed on lateral integral extensions of the crank pin end of the main rod, as shown in Fig. 4, the relation of the main and coupling rods first described being maintained under such modification of structural detail.

It will be seen that by reason of the coupling rods, 9 and 10, being connected to the main rod, 7, on opposite sides thereof, concentrically with the main crank pin, the main rod is not subjected to bending moment resultant upon thrust transmitted through the coupling rods. For example, when the main rod is being pulled forward in the direction of the arrow, Fig. 3, the ends of the rods, 9 and 10, bear on the front of the bushing, 7ᵃ, and, conversely, when the main rod is being pushed in the opposite direction, they bear on the back of said bushing. The described disposition of connecting members consequently transmits the force applied through the main rod, directly to the coupling rods, without passing through the main crank pin. The single main rod bearing, 8ᵃ, of said pin, has, therefore, imposed upon it only the duty of rotating the main driving wheel in which it is fixed, and of supporting the weight of the rods.

The application of my invention in a six coupled locomotive has been selected for illustration, as presenting, in the simplest form, its essential structural and operative principle, but it will be obvious to those familiar with locomotive construction, that it is applicable, without departure from such essential principle, in all locomotives having three or more pairs of driving wheels, particularly those of the eight and ten coupled types, which have been, and now are, those most generally approved for heavy freight service. In the instance shown, the vertical longitudinal central planes of the coupling rods, 9 and 10, are disposed at equal distances from that of the main rod, 7, in order to avoid the imposition of bending moment on the latter, and this disposition should be adopted in all cases where, as in this instance, and in a ten coupled locomotive, the same number of driving axles is located in front of the main axle as in rear thereof. When, however, the locomotive is of a type having unequal numbers of driving axles in front and in rear, respectively, of the main axle, the distances of the vertical longitudinal planes of the coupling rods which are connected to the main rod, from that of said rod, should be made inversely proportional to the thrust borne by the coupling rods. For example, in a locomotive having four driving axles, one of which is located in front of, and two in rear of, the main axle, the coupling rods leading forward will rotate one driving axle, and those leading backward will rotate two driving axles. The vertical longitudinal central planes of the coupling rods leading forward should, therefore, be spaced twice as far from that of the main rod as those of the coupling rods leading backward, as shown in Fig. 5.

Among the important advantages attainable by my invention, the following may be noted. In large locomotives of the ten coupled type, a reduction of six inches may be made in the transverse distance between the axes of the cylinders, which will materially reduce the transverse racking and strain of the locomotive by the reduction of the lever arms through which the piston effort is exerted on the frame, and will admit of either building the same sized locomotive for operation within clearances six inches narrower than standard, or, conversely, of applying larger cylinders within a standard or determined clearance. A reduction of the rotating weights on the main crank pins is effected, and less work will be imposed upon these pins than in the ordinary construction, correspondingly reducing the tendency to heating from which difficulty in operation is frequently occasioned. The bearings of the coupling rods have no motion of rotation, relatively to the main rod, there being only a pushing and pulling action imparted by the main rod, and a small degree of motion due to the angular motion of the latter. These bearings may therefore be reduced in area, as compared with the crank pin bearings at the opposite ends of the coupling rods. Finally and particularly, the improvement does not involve increase of either cost or complication in construction and maintenance, and is applicable, without interference with, or modification of, other elements of the locomotive, in the various standard types of present practice.

I claim as my invention and desire to secure by Letters Patent:

1. In a locomotive engine having a plurality of driving axles, the combination of a main crank pin; a main connecting rod coupled thereto; and coupling rods, fitted on the main rod, independently of the main crank pin and concentrically therewith.

2. In a locomotive engine having a plurality of driving axles, the combination of a main crank pin; a main connecting rod coupled thereto and having lateral coupling rod bearings; and coupling rods, each fitted on one of the bearings of the main rod.

3. In a locomotive engine having a plurality of driving axles, the combination of a main crank pin; a main connecting rod coupled thereto and having lateral coupling rod bearings of unequal lengths; and coupling rods, each fitted on one of the bearings of the main rod, throughout the length of said bearing.

4. In a main connecting rod for a locomotive having a plurality of driving axles, the combination of a body; a solid end bored to fit a main crank pin and projecting laterally from opposite sides of the body; and coupling rod bearings, of unequal length, formed on the opposite projecting portions of the rod end, concentrically with the bore thereof.

5. In a locomotive engine having a plurality of driving axles, the combination of a main crank pin; a main connecting rod coupled thereto; and oppositely extending coupling rods, fitted on the main rod, independently of the main crank pin and concentrically therewith.

6. In a locomotive engine having a plurality of driving axles, the combination of a main crank pin; a main connecting rod coupled thereto and having lateral coupling rod bearings; and oppositely extending coupling rods, each fitted on one of the bearings of the main rod.

7. In a locomotive engine having a plurality of driving axles, the combination of a main crank pin; a main connecting rod coupled thereto and having lateral coupling rod bearings of unequal lengths; and oppositely extending coupling rods, each fitted on one of the bearings of the main rod, throughout the length of said bearings.

8. In a locomotive engine having a plurality of driving axles having wheels, the combination of a main crank pin on a wheel, of an intermediate axle, a main connecting rod coupled to said crank pin, and coupling rods extending in opposite directions from said intermediate wheel, at least one of said coupling rods being fitted on the main connecting rod independently of the main crank pin and concentric therewith.

WILLIAM DALTON.

Witnesses:
J. SNOWDEN BELL,
A. S. FOWLER.